United States Patent [19]

Mizuno et al.

[11] Patent Number: 4,467,176

[45] Date of Patent: Aug. 21, 1984

[54] HOT-WIRE ARC WELDING APPARATUS

[75] Inventors: Takaji Mizuno; Yoshiaki Kato; Takao Shimizu, all of Aichi, Japan

[73] Assignee: Mitsubishi Denki Kabushiki Kaisha, Tokyo, Japan

[21] Appl. No.: 455,712

[22] Filed: Jan. 5, 1983

[30] Foreign Application Priority Data

Jan. 11, 1982 [JP] Japan .................................. 57-2529

[51] Int. Cl.³ .............................................. B23K 9/10
[52] U.S. Cl. ........................... 219/137.71; 219/130.5; 219/137 PS
[58] Field of Search ............ 219/130.5, 130.21, 130.31, 219/130.32, 130.33, 137 PS, 137.71

[56] References Cited

U.S. PATENT DOCUMENTS 3,019,329 1/1962 Zeller .............................. 219/130.5
3,584,185 6/1971 Mann et al. ..................... 219/130.32
3,689,734 9/1972 Burley et al. ..................... 219/130.5

Primary Examiner—C. C. Shaw
Attorney, Agent, or Firm—Sughrue, Mion, Zinn, Macpeak, and Seas

[57] ABSTRACT

A hot-wire arc welding apparatus comprises a nonexpendable electrode, means for supplying a current to initiate an arc between the nonexpendable electrode and a workpiece, an arc current control means for controlling the current from the supplying means, a wire feed means for feeding a filler wire into the arc, a wire feed control means for controlling the wire feed means to feed the filler wire at a given rate of feed, a voltage applying means for applying a voltage between the filler wire and the workpiece, a wire voltage control means for controlling the voltage from the voltage applying means, and a reference voltage generator for generating an output voltage which increases gradually or incrementally with time, each of the arc current control means, the wire feed control means, and the wire voltage control means being connected to the reference voltage generator and responsive to the output voltage therefrom for controlling the operation thereof. A delay circuit such as an integrator may be connected between the reference voltage generator and the wire feed control means for applying a delayed output voltage to the latter.

3 Claims, 16 Drawing Figures

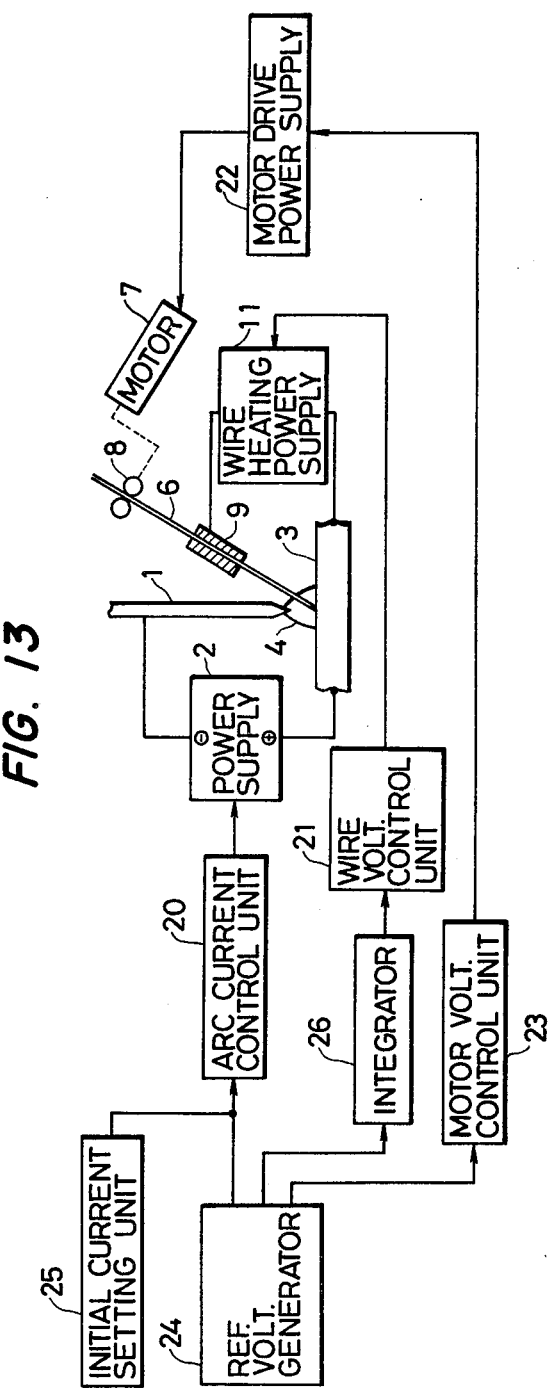
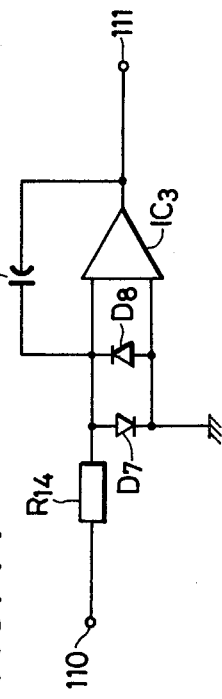
FIG. 13
FIG. 14

HOT-WIRE ARC WELDING APPARATUS

BACKGROUND OF THE INVENTION

The present invention relates to a hot-wire arc welding apparatus having a nonexpendable electrode for welding a workpiece while a filler wire heated by a voltage applied thereto is being fed to the weld, and more particularly to a control circuit for getting such a hot-wire arc welding apparatus started in a welding operation.

One generally known type of hot-wire arc welding apparatus, as shown in FIG. 1 of the accompanying drawings, comprises a tungsten electrode 1 which is supplied with a current from an arc power supply 2 for generating an arc 4 between the electrode 1 and a workpiece 3, there being a melted pool 5 formed on the workpiece 3 by the arc 4. A filler wire 6 is fed to the weld by a filler wire feeder composed of a motor 7 and drive rollers 8, through a current feeder tip 9 and an insulating guide 10. A wire heating power supply 11 applies a voltage across the current feeder tip 9, the filler wire 6, the molten pool 5, and the workpiece 3 to heat the filler wire 6 due to its resistance. When the filler wire 6 as thus heated to a high temperature is fed into the melted pool 5, the filler wire 6 can easily be melted by the heat of the arc 4 and the melted pool 5, thus forming a deposit of metal 12 on the workpiece 3. The tungsten electrode 1 extends coaxially through a shield nozzle 13. The filler wire 6 is supplied from a coil of filler wire mounted on a wire reel 14.

The voltage is applied to the filler wire 6 through a distal end (hereinafter referred to as a "feeder point") 9a of the current feeder tip 9. The filler wire 6 starts to be heated as it is fed along past the feeder point 9a and is heated to an optimum temperature when it reaches the workpiece 3. At the time of starting welding operation, a portion of the filler wire 6 which is closer than the feeder point 9a to the workpiece 3 is fed into the melted pool 5 at a temperature lower than the optimum temperature. Particularly, a tip end portion of the filler wire 6 in the vicinity of the workpiece 3 remains unheated at the time of the start of the welding operation. When such an unheated tip end portion of the filler wire 6 is fed, it plunges into the melted pool 5 or the unmelted end portion of the filler wire 6 is displaced out of the melted pool 5, with the result that welding imperfections are caused at an initial portion of the weld.

FIG. 2 illustrates a conventional control method proposed to cope with the above difficulty. According to this control method, the rate of feed of the filler wire and the current supplied for heating the filler wire are controlled to vary with time, namely, to increase gradually in synchronism with each other. The proposed method allows the filler wire to be fed at a proper rate at all times without abrupt changes in the rate as shown in FIG. 3. The abrupt changes result in a difficulty in that the filler wire, which has not been preheated to the optimum temperature, plunges into the melted pool 5. Such a conventional method, however, is disadvantageous in that it does not control the arc current, and hence the filler wire 6 becomes melted into droplet 15 prior to reaching the workpiece 3 due to the arc heat while the filler wire 6 is being fed at a low speed right after the welding operation has started. Since the filler wire 6 has a tendency to coil, the melted droplet 15 is liable to be attached to the tungsten electrode 1, and thus the device fails to produce a good weld at frequent intervals. FIG. 4 is a diagram illustrating the filler wire 6 and its tendency to coil, and FIG. 5 is a fragmentary side elevational view of an electrode, a workpiece and a filler wire, the view being utilized to illustrate a difficulty with the prior art welding apparatus.

SUMMARY OF THE INVENTION

Accordingly, it is an object of the present invention to provide a hot-wire arc welding apparatus capable of starting the welding operation without causing welding imperfections and also without allowing melted wire droplets to be attached to the tungsten electrode. The invention is effected by suitably controlling the arc current, the rate of feed of the filler wire, and the voltage for heating the filler wire.

According to the present invention, a hot-wire arc welding apparatus comprises a nonexpendable electrode, means for supplying a current to initiate an arc between the nonexpendable electrode and a workpiece, an arc current control means for controlling the current from the supplying means, a wire feed means for feeding a filler wire into the arc, a wire feed control means for controlling the wire feed means to feed the filler wire at a given rate, a voltage applying means for applying a voltage between the filler wire and the workpiece, a wire voltage control means for controlling the voltage from the voltage applying means, and a reference voltage generator for generating an output voltage which increases gradually or incrementally with time, each of the arc current control means, the wire feed control means and the wire voltage control means being connected to the reference voltage generator and being responsive to the output voltage therefrom for controlling the operation thereof. A delay circuit such as an integrator may be connected between the reference voltage generator and the wire feed control means for applying a delayed output voltage to the latter.

The foregoing, as well as other objects of the present invention, will become more apparent from the following description when taken in conjunction with the accompanying drawings in which preferred embodiments of the present invention are shown by way of illustrative example.

BRIEF DESCRIPTION OF THE DRAWINGS

In the accompanying drawings:

FIG. 13 is a block diagram of a hot-wire arc welding apparatus according to another embodiment, constructed to effect the mode of operation illustrated in FIG. 12;

FIG. 14 is a diagram showing in detail the circuit arrangement of an integrator 26;

DESCRIPTION OF THE PREFERRED EMBODIMENTS

Figure 1:
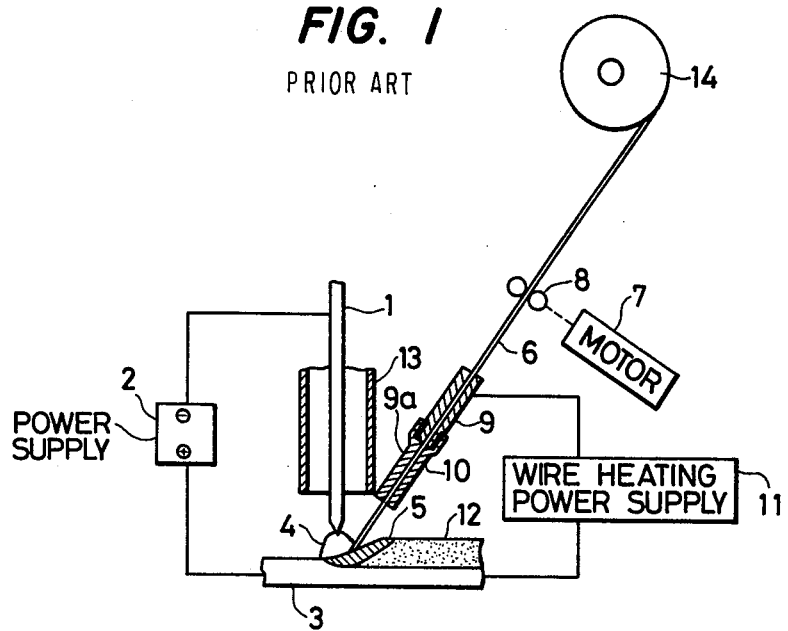
FIG. 1 is a schematic diagram showing a conventional hot-wire arc welding apparatus.
Figure 2:
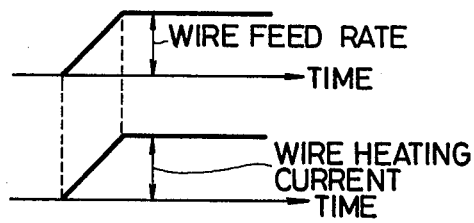
FIG. 2 is a diagram illustrative of the manner in which the prior hot-wire welding apparatus operates at the time of starting a welding operation.
Figure 6:
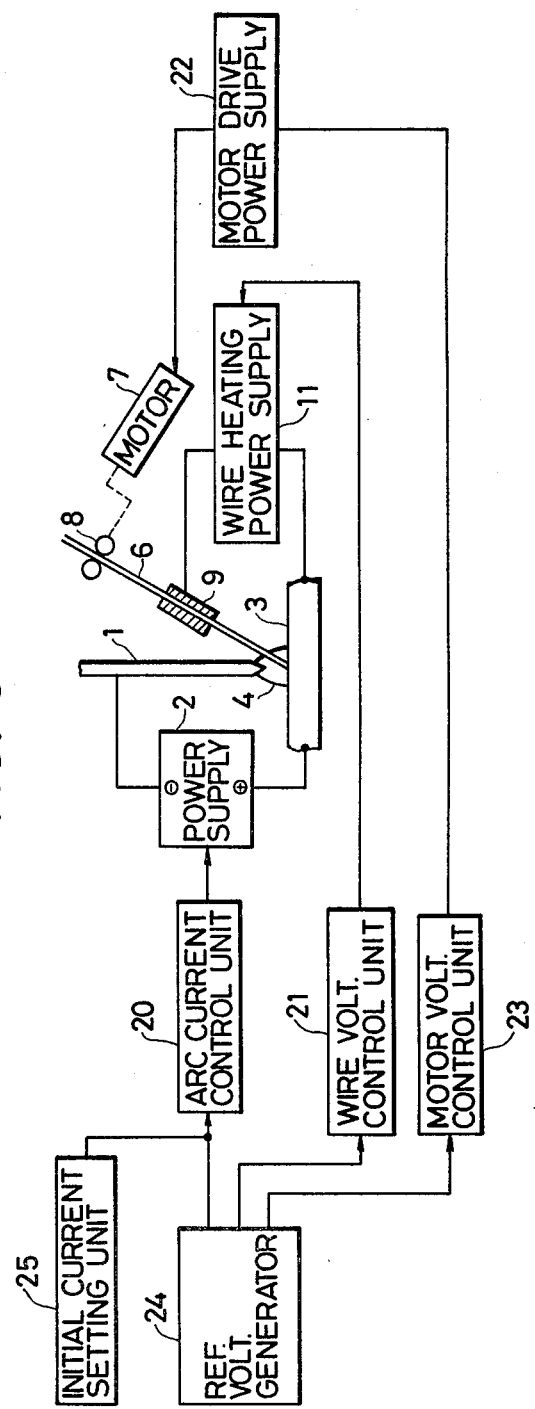
FIG. 6 is a block diagram of a hot-wire arc welding apparatus according to an embodiment of the present invention.

FIG. 6 shows a hot-wire arc welding apparatus according to an embodiment of the present invention. Identical parts illustrated in FIG. 6 are designated by the same reference numerals in FIG. 1, and will not be described for the sake of brevity. The arc current supplied from the arc power supply 2 is controlled by an arc current control unit 20, and the voltage applied to the filler wire 6 by the wire heating power supply 11 is controlled by a wire voltage control unit 21. The motor 7 is drivable by a motor drive power supply 22 which is controlled by a motor voltage control unit 23. A reference voltage generator 24 produces an output voltage which is applied as an input to each of the control units 20, 21 and 23. A current setting unit 25 for producing an initial current setting when an arc is to be generated has an output terminal connected to the arc current control unit 20. The reference voltage generator 24 serves to generate an output voltage which gradually increases up to a predetermined voltage setting within a preset period of time. The output voltage from the reference voltage generator 24 is applied to the arc current control unit 20 in which the output voltage is converted into a signal for controlling the output current of the arc power supply 2. The output voltage from the reference voltage generator 24 is also applied to the motor voltage control unit 23 in which the output voltage is converted into a signal for controlling the output voltage of the motor drive power supply 22. The wire voltage control unit 21 is also supplied with the output voltage from the reference voltage generator 24 and converts the output voltage into a signal for controlling the output voltage of the wire heating power supply 11.

Figure 7:
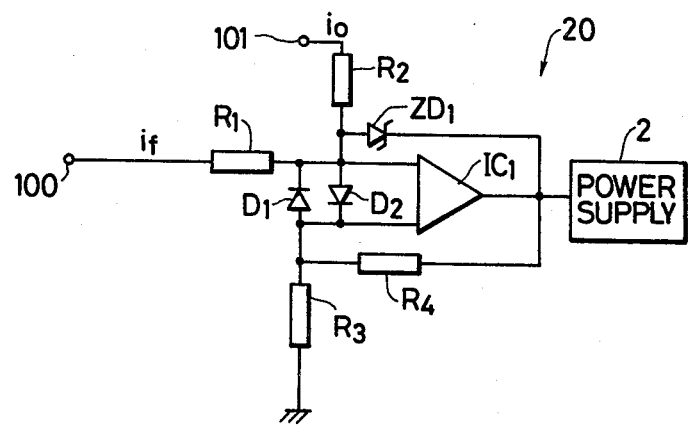
FIG. 7 to FIG. 10 are diagrams showing in detail the circuit arrangement of an arc current control unit 20, a wire voltage control unit 21, a motor drive power supply 22, a motor voltage control unit 23, a reference voltage generator 24 and a current setting unit 25, respectively.

The above described units 20, 21, 23 and 25, power supply 22 and generator 24 will be described in detail with reference to FIGS. 7 to 10. FIG. 7 is a detailed circuit diagram of the arc current control unit 20, in which a detected arc current $i_f$ fed to an input terminal 100 is compared with an input signal to an input terminal 101 which is obtained by converting output signals from the reference voltage generator 24 and the initial current setting unit 25 into a current signal $i_0$. When the current signal $i_0$ is larger than the detected arc current $i_f$, an output $V_0$ is supplied to the power supply 2.

Figure 8:
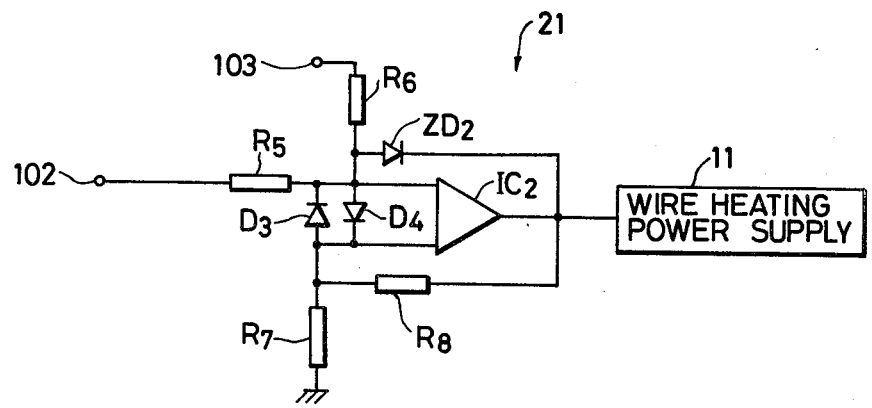

FIG. 8 is a detailed circuit diagram of the wire voltage control unit 21. A voltage appearing across the filler wire 6 and the workpiece 3 is detected and the detected voltage is then converted to a current signal to be applied to an input terminal 102. Applied to an input terminal 103 is an input signal which is obtained by converting the output signal from the reference voltage generator 24 into a current signal. The input current signals are compared with each other, so that an output signal is supplied to the wire heating power supply 11 when the current signal applied to the terminal 103 is larger than the other signal.

Figure 9:
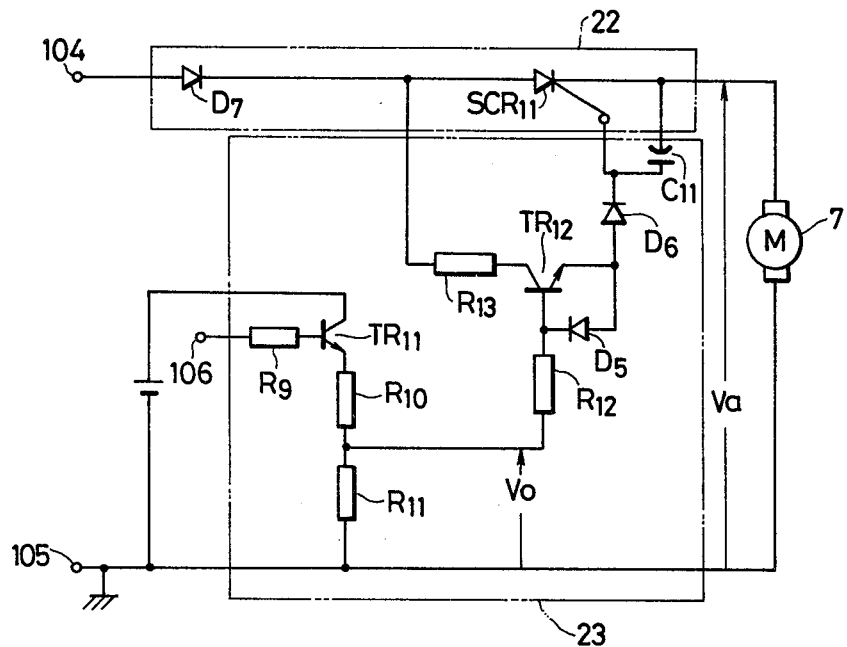

FIG. 9 is a detailed circuit diagram of the motor drive power supply 22 and the motor voltage control unit 23. In FIG. 9, terminals 104 and 105 are conected to the power supply whereas a terminal 106 is connected to the reference voltage generator 24. A capacitor $C_{11}$ is charged by a voltage signal ($V_0 - V_a$) and a thyristor $SCR_{11}$ constituting the motor drive power supply 22 is triggered by a voltage appearing across the capacitor $C_{11}$ to thereby drive the motor 7.

Figure 10:
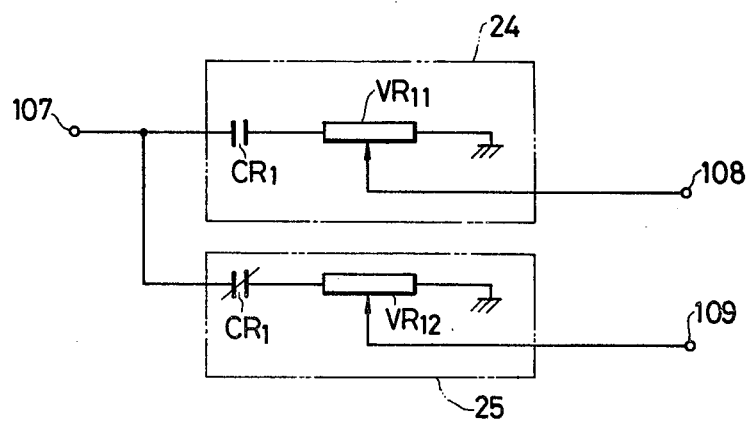

FIG. 10 is a detailed circuit diagram showing the reference voltage generator 24 and the initial current setting unit 25. In FIG. 10, a terminal 107 is connected to the power supply. An output reference voltage of the reference voltage generator 24 is varied by controlling a variable resistor $VR_{11}$. The output reference voltage is applied through a terminal 108 to the arc current control unit 20, the wire voltage control unit 21 and the motor voltage control unit 23. On the other hand, the setting value of the initial current setting unit 25 is varied by controlling a variable resistor $VR_{12}$. The output signal of the unit 25 is applied through an output teminal 109 to the arc current control unit 20. Reference character $CR_1$ designates the contact of an electromagnetic interruptor excited by a current flowing between the filler wire 6 and the workpiece 3. A normally opened contact is coupled to the reference voltage generator 24 whereas a normally closed contact is coupled to the initial current setting unit 25. It should be noted that both contacts are not simultaneously actuated. In FIGS. 7 through 10, reference character R denotes a resistor, D a diode, ZD a zener diode, SCR a thyristor, IC an amplifier, TR a transistor and VR a variable resistor.

Figure 5:
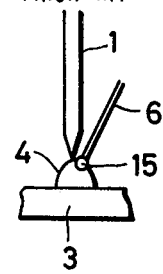
FIG. 5 is a fragmentary side elevational view of an electrode, a workpiece and a filler wire, the view being utilized to illustrate a difficulty with the prior art welding apparatus.
Figure 3:
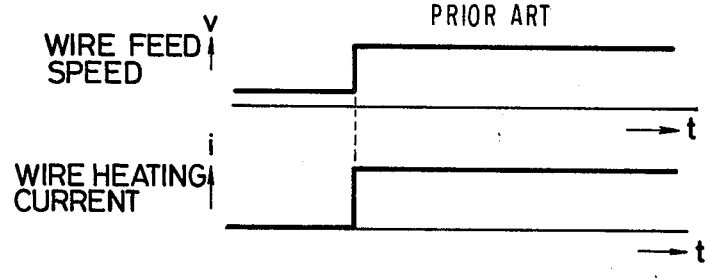
FIG. 3 is a diagram showing abrupt changes in a wire feed speed and a wire heating current.
Figure 4:
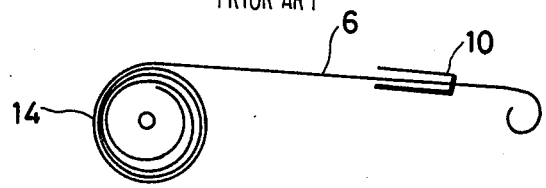
FIG. 4 is a diagram showing a filler wire having a tendency to coil.
Figure 11:
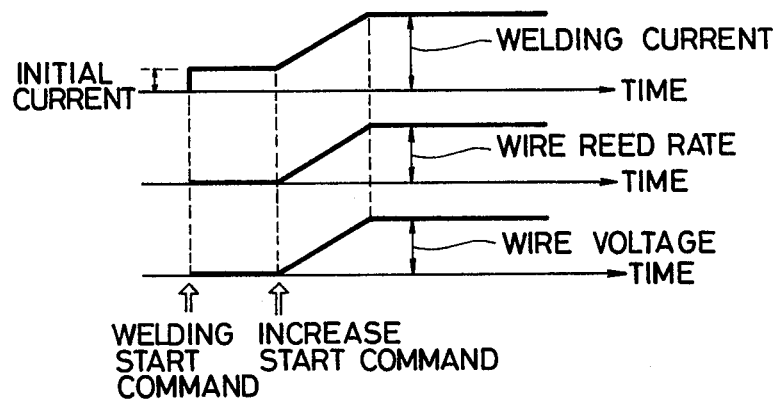
FIG. 11 is a diagram showing the manner in which the hot-wire arc welding apparatus of FIG. 6 operates driving the welding start-up period.

In operation, as shown in FIG. 11, when a welding starting command is given, an arc 4 is ignited or initiated between the electrode 1 and the workpiece 3. At this time, the arc current supplied from the arc power supply 2 is of a level preset by the initial current setting unit 25. Then, an increase start command is given to allow the output voltage from the reference voltage generator 24 to increase up to a preset value within a preset interval of time. The input to the arc current control unit 20 then becomes the sum of the output voltage from the initial current setting unit 25 and the output voltage from the reference voltage generator 24. Thus, the arc current gradually increases from the initial current to a preset welding current. At the same time, the output voltage from the motor drive power supply 23, that is, the RPM of the motor 7 (the rate of feed of the filler wire 6), and the output voltage from the wire heating power supply 11, namely, the voltage applied to the filler wire 6, are increased gradually up to their preset levels. The arc or welding current, the rate of wire feed, and the wire voltage which vary with time are shown in FIG. 5.

With the foregoing arrangement, the arc current is increased gradually in synchronism with the rate of wire feed and the wire voltage, allowing the filler wire 6 to reach the workpiece 3 without the danger of a melted wire droplet 15 growing into a size large enough to be attached to the tungsten electrode 1 while the filler wire 6 is being fed at a low speed immediately after the filler wire 6 has started to be fed. This permits a stable and good initial weld portion to be formed.

Figure 12:
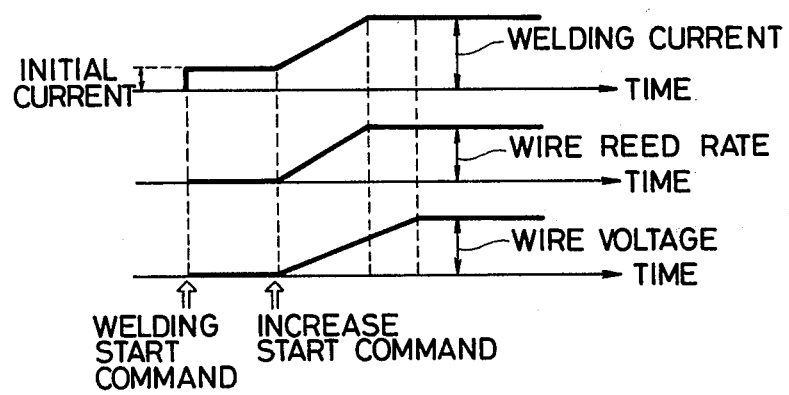
FIG. 12 is a diagram showing the manner in which another hot-wire arc welding apparatus according to the present invention operates upon starting.

FIG. 12 is illustrative of the manner of operation of another hot-wire arc welding apparatus of the present invention. The manner of operation shown in FIG. 12 is different from that of FIG. 11 in that the wire voltage gradually increases within a period of time longer than that in which the rate of wire feed gradually increases. There has been a tendency for the filler wire to be melted off in the vicinity of the end of the slope at which the rate of wire feed increases, dependent on the wire diameter and the wire material. This is due to a fuse effect which occurs at the time when the wire heat amount remarkably increases with respect to the wire feed rate. It is considered that the fuse effect is caused by the radiation heat at an arc being generated, heat transmission from the molten pool and the like. Such a problem can be eliminated by selecting a longer time interval in which the wire voltage increases than that in which the rate of wire feed increases as illustrated in FIG. 12. The hot-wire arc welding apparatus for effecting such a mode of operation is shown in FIG. 13, in which the output voltage from the reference voltage generator 24 is integrated by an integrator 26 so as to be delayed, and the delayed output from the integrator 26 is supplied to the wire voltage control unit 21.

A detailed circuit diagram of the integrator 26 is shown in FIG. 14, in which the output signal from the reference voltage generator 24 is fed to an input terminal 110 to be integrated. The thus integrated signal is outputted through an output terminal 111 to the wire voltage control unit 21.

To reduce the present invention to practice, it is necessary to take into account the following point: No problem will arise when the distal end of the filler wire 6 is positioned in the vicinity of the tungsten electrode 1 prior to starting the welding operation. However, when the end of the filler wire 6 happens to be located at the outlet of the insulating guide 10 such as when cut off by pliers at the time of increasing the arc current, the rate of wire feed, and the wire voltage, these parameters will have already reached the midpoints of their slopes of increase upon arrival of the filler wire 6 at the work 3. Accordingly, this condition cannot benefit from the foregoing modes of controlling operation of the present invention. To cope with the above problems, it is necessary that the parameters be started to increase along their slopes in response to detection of the filler wire 6 contacting the workpiece 3, or the filler wire 6 entering the arc 4.

Figure 15:
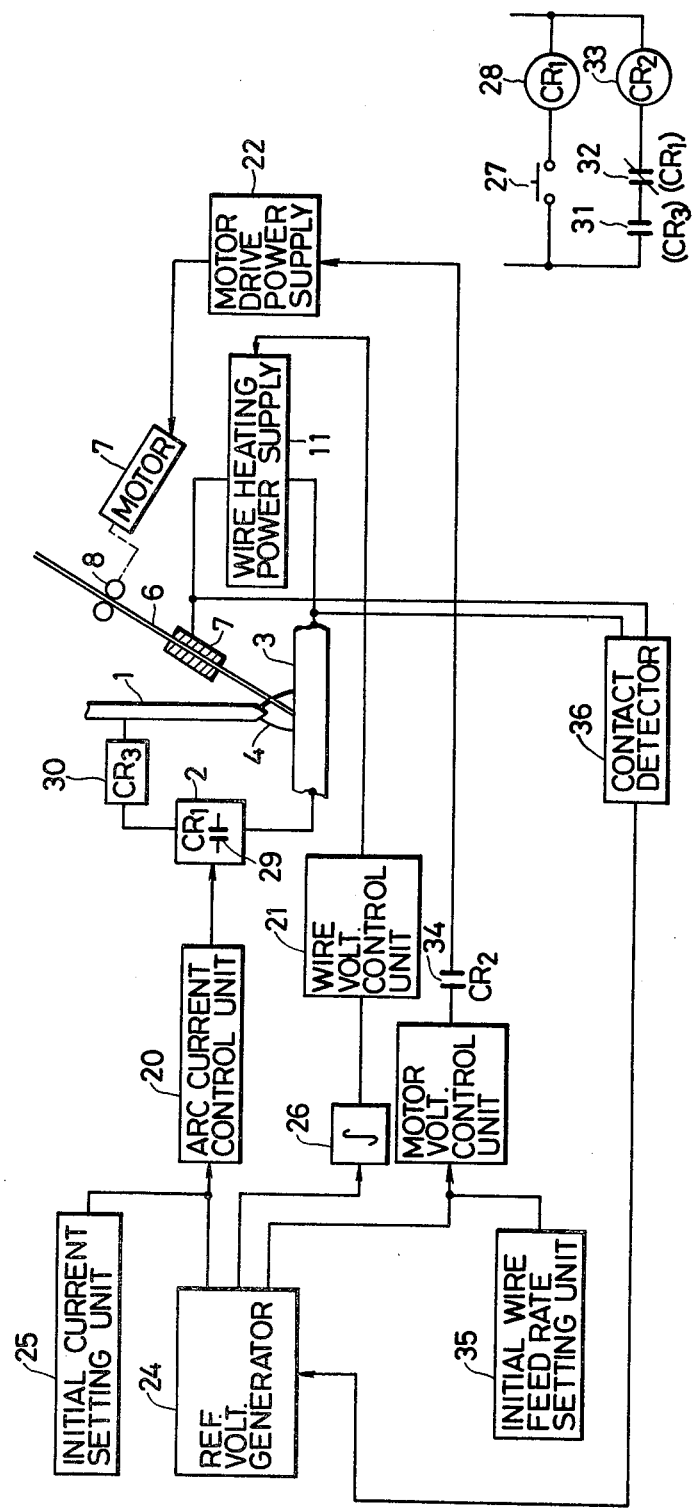
FIG. 15 is a block diagram of a hot-wire arc welding apparatus according to another embodiment of the present invention.
Figure 16:
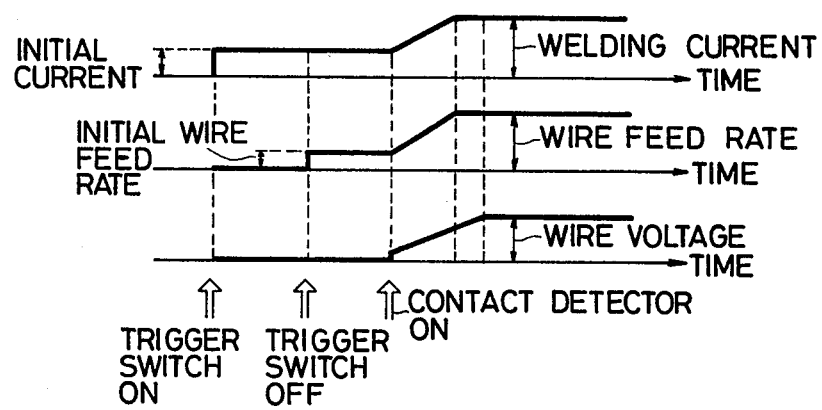
FIG. 16 is a diagram showing the way in which the hot-wire arc welding apparatus of FIG. 15 operates when the welding operation is initiated.

FIGS. 15 and 16 illustrate a hot-wire arc welding apparatus according to another embodiment, which is modified to meet the above requirement. In FIG. 15, a trigger switch 27 is mounted on the welding torch, and when the trigger switch 27 is turned on, a relay 28 is energized to give a welding start command. Then, a normally open contact 29 of the relay 28 is closed to allow an initial current to flow from the arc power supply 2 to generate an arc 4. A current detecting relay 30 is thus turned on by the initial current and its normally closed contact 31 is also turned on. At this time, the trigger switch 27 is still turned on, and therefore a normally closed contact 32 of the relay 28 remains turned off. A motor drive relay 33 remains turned off at this time, and the filler wire 6 is thus not fed. Then, the trigger switch 27 is released to turn off the relay 28, whereupon its normally closed contact 32 is turned on, and the motor drive relay 33 is turned on with its normally open contact 34 turned on to start feeding the filler wire 6 toward the workpiece 3. The speed of feed of the filler wire 6 is set up by an initial wire feed rate setting unit 35. When the filler wire 6 is fed into the arc 4, or contacts the workpiece 3, a contact detector 36 is actuated to give an increase start command to the reference voltage generator 24, thus enabling the parameters to start increasing. FIG. 16 is illustrative of the foregoing sequence of steps of operation of the hot-wire arc welding apparatus of FIG. 15. The initial wire feed rate setting unit 35 is substantially identical to the circuit shown in FIG. 13, in which the setting operation is carried out by controlling a variable resistor. In addition, the contact detector 36 is constituted by a relay coupled between the current feeder tip 9 and the workpiece 3. This embodiment is more advantageous in that the welding operation can be started well at all times irrespective of the position of the wire end, for more ease in the welding of the workpiece 3.

While in the illustrated embodiments arc generation is controlled by a current flowing through the tungsten electrode and filler wire heating is controlled by a voltage applied to the filler wire, the present invention should not be interpreted as being limited to such arrangements, but may include other modifications. For example, the arc can be generated under the control of a voltage applied to the tungsten electrode, and the filler wire can be heated under the control of a current flowing therethrough.

Although a certain preferred embodiment has been shown and described, it should be understood that many changes and modifications may be made therein without departing from the scope of the appended claims.

What is claimed is:

1. A hot-wire arc welding apparatus comprising:
   a nonexpendable electrode;
   means for supplying an arc current to ignite an arc between said nonexpendable electrode and a workpiece;
   means for controlling the arc current from said supplying means;
   means for feeding a filler wire into the arc;
   means for controlling said wire feeding means to feed the filler wire at a given rate of feed;
   means for applying a voltage between the filler wire and the workpiece;
   means for controlling the voltage from said voltage applying means; and
   means for generating a reference voltage which increases gradually with time, each of said arc current control means, said wire feed control means, and said wire voltage control means being connected to said reference voltage generating means and being responsive to the output voltage therefrom, said arc current control means, said wire feed control means and said wire voltage control means operating in response to said output voltage such that said arc current, said rate of filler wire feed and said voltage applied to said filler wire are gradually increased in substantial synchronism.

2. A hot-wire arc welding apparatus comprising:
   a nonexpendable electrode;

means for supplying an arc current to ignite an arc between said nonexpendable electrode and a workpiece;

means for controlling the arc current from said supplying means;

means for feeding a filler wire into the arc;

means for controlling said wire feeding means to feed the filler wire at a given rate of feed;

means for applying a voltage between the filler wire and the workpiece;

means for controlling the voltage from said voltage applying means;

means for generating a reference voltage which increases gradually in a first period of time, each of said arc current control means and said wire feed control means being connected to said reference voltage generating means and responsive to the output voltage therefrom for controlling operation thereof; and a delay circuit connected between said reference voltage generating means and said wire voltage control means and responsive to the output voltage from said reference voltage generating means for issuing a delayed output voltage which increases in a second period of time longer than said first period of time to said wire voltage control means.

3. A hot-wire arc welding apparatus comprising:

a nonexpendable electrode;

means for supplying an arc current to ignite an arc between said nonexpendable electrode and a workpiece;

means for controlling the arc current from said supplying means;

means for feeding a filler wire into the arc;

means for controlling said wire feeding means to feed the filler wire at a given rate of feed;

means for applying a voltage between the filler wire and the workpiece;

means for controlling the voltage from said voltage applying means;

means for generating a reference voltage which increases gradually with time, each of said arc current control means, said wire feed control means, and said wire voltage control means being connected to said reference voltage generating means and responsive to the output voltage therefrom for controlling operation thereof;

means for setting an initial current, which is connected to said arc current control means to set an initial current to said arc current control means;

means for setting an initial wire feed rate, which is connected to said wire feed control means to set the latter with an initial wire feed rate setting;

means for detecting the initial current to produce an arc;

means for detecting contact between the filler wire and the workpiece or insertion of the filler wire into the arc and for allowing the output voltage from said reference voltage generating means to increase in response to such detection; and a trigger switch operable in response to detection by said arc current detector to start feeding operation of the filler wire at the initial wire feed rate determined by said initial wire feed rate setting unit.

* * * * *